P. L. WEIMER.
WHEELBARROW.
No. 172,807. Patented Jan. 25, 1876.
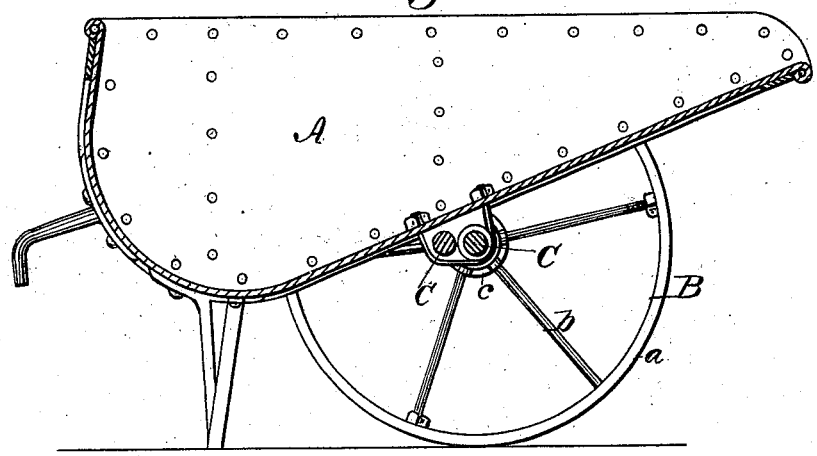
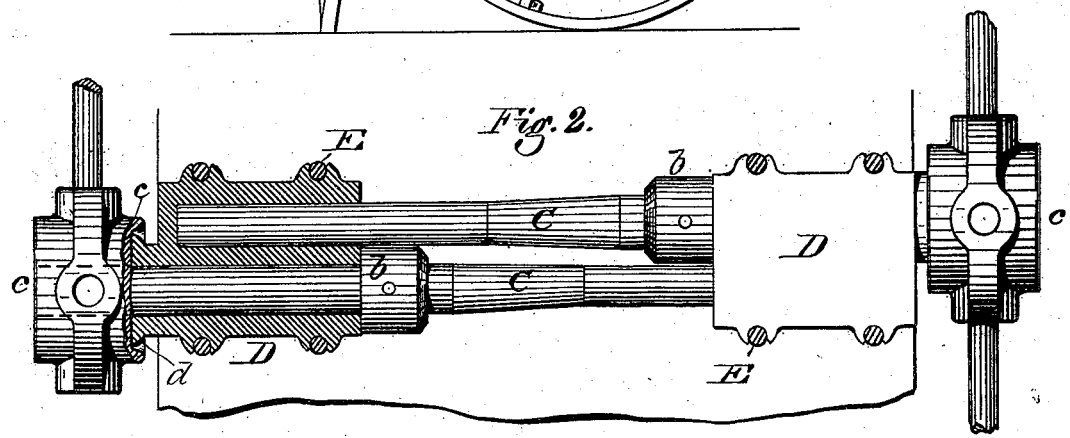
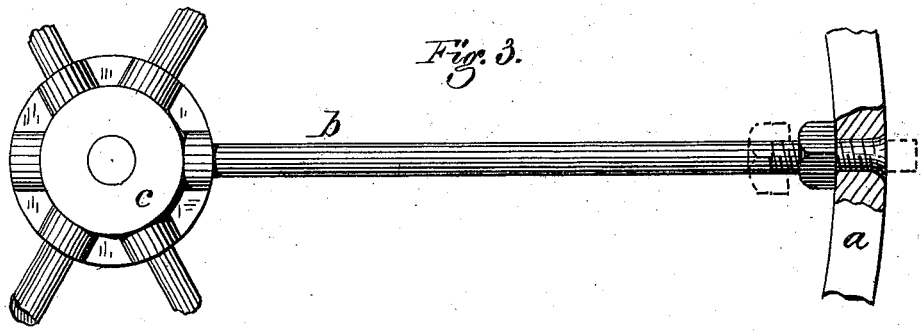

UNITED STATES PATENT OFFICE.

PETER L. WEIMER, OF LEBANON, PENNSYLVANIA.

IMPROVEMENT IN WHEELBARROWS.

Specification forming part of Letters Patent No. 172,807, dated January 25, 1876; application filed October 21, 1875.

*To all whom it may concern:*

Be it known that I, PETER L. WEIMER, of Lebanon, in the county of Lebanon and State of Pennsylvania, have invented certain Improvements in Barrows, of which the following is a specification:

My invention relates to the two-wheeled iron barrows employed in furnace service; and consists in a peculiar manner of constructing and arranging the details of the same, as hereinafter described.

Figure 1 represents a longitudinal central section of my barrow; Fig. 2, a plan view of the axles and their bearings or boxes, with one of the latter in section; Fig. 3, a view illustrating the manner of constructing the wheels.

A represents the metal body of the barrow, made in the ordinary manner, with a bottom inclining downward from the front to the rear end. B B represent the two outside supporting-wheels, secured rigidly upon the ends of two separate independent axles, C, which extend, side by side, across the full width of the barrow, with their ends supported in blocks or bearings D, which are secured to the under side of the body by stirrups E, as shown, each block forming the inner bearing of one shaft and the outer bearing of the other, as shown, the shafts being arranged in the same horizontal plane, so as to maintain the body in a proper position.

The wheels are each composed of a wrought rim, wrought spokes, and a hub cast upon the spokes after they are inserted in the rim.

In forming the wheel I arrange every alternate spoke, or all of them if preferred, with their ends extending loosely through and beyond the rim or tire, and while they are thus arranged cast the hub upon their inner ends.

The shrinkage of the hub as it cools simply draws the loose-ended spokes inward through the rim, neither straining nor bending the parts, nor affecting the stability of the wheel.

After the cooling of the hub the ends of the spokes are riveted or headed down, the tire being preferably countersunk, as shown, in order to leave a smooth outer surface.

It is also preferred, in constructing the wheels, to thread the outer ends of the spokes, and provide them, before their insertion into the rim, with nuts $a$, which may be screwed up against the inside of the rim after the hub is cool, for the purpose of supporting the rim and holding all the parts firmly in place, as in Fig. 3.

By thus constructing my wheels I prevent the parts from being subjected to undue tension, avoid the bending of the rim, and insure the production of a true wheel of great strength and stability.

I am aware that wheels having wrought rim and spokes and a cast hub are old, and I make no claim thereon, except when constructed in the manner above described.

As shown in the drawing, the wheels of the barrow are secured rigidly upon the ends of two separate axles, extending side by side across the barrow below its inclined bottom, and seated in the blocks or bearings D, which are secured to the body, as before stated, by stirrups E. Each block D is made solid and complete in one piece, and adapted to receive the inner end or neck of one axle and the outer end of the other, as shown.

The blocks are so constructed and arranged that, although secured to the inclined bottom of the body, they hold the two shafts parallel with each other, and in the same horizontal plane, so that the barrow has no tendency to run sidewise.

Each shaft is held in its bearings by a collar, $b$, pinned fast upon it against the inner side of one of the bearing-blocks, as shown, so that, in order to release either axle and permit its removal with its wheel, it is only necessary to drive out the pin holding the collar.

This arrangement permits the ready removal of either wheel and axle without affecting the other or disturbing the adjustment of the bearings.

Another feature of my barrow consists in the arrangement to prevent dust and sand from finding their way into the axle-bearings next to the wheels.

I cast each hub with an inwardly-projecting flange, $c$, around its edge, and also provide the axle-bearing with an enlargement or flange, $d$, fitting against the end of the hub within the flange $c$, as clearly shown in Fig. 2.

The flange $c$ serves as a guard to prevent the sand, &c., from falling or being thrown directly into the joint between the hub and bearing, while the flange *d* prevents the same from working laterally into the joint, the arrangement being such that sand, &c., will be directed by the flange *c* outside of or behind the flange *d*, which will prevent them from working into the joint.

A considerable space is left between the flanges *c* and *d*, as shown in the drawing, so that sand or gritty matters cannot be held by the flanges and carried into the bearing, the flanges serving not to close the joint, but as deflectors to prevent foreign matters from falling therein.

By arranging the flanges in the manner shown I am enabled to cast the parts ready for use without requiring the flanges to be finished or fitted up, thus rendering the construction very cheap. The construction is also simplified and cheapened by inserting the axles endwise to their places and securing them by the collars, so that I am enabled to use bearing-blocks each in a single solid piece.

Having thus described my invention, what I claim is—

1. The herein-described barrow, consisting of the metal body A, wheels B, axles C, and bearing-blocks D, constructed and arranged as shown and described.

2. The wheel consisting of the wrought-iron rim *a*, the cast hub, and the threaded spokes *b*, provided with the nuts and the enlarged or headed outer ends, as shown and described.

3. The parallel axles C, mounted in the bearings D, as shown, and secured by the collars *b*, so that either axle may be readily removed without affecting the other or disturbing the bearings.

PETER L. WEIMER.

Witnesses:
    JOHN BIRKINBINE,
    W. G. SANDS.